April 29, 1969      H. W. NORTON      3,441,155
ADJUSTABLE IMPLEMENT CARRYING STRUCTURES
Filed May 22, 1967
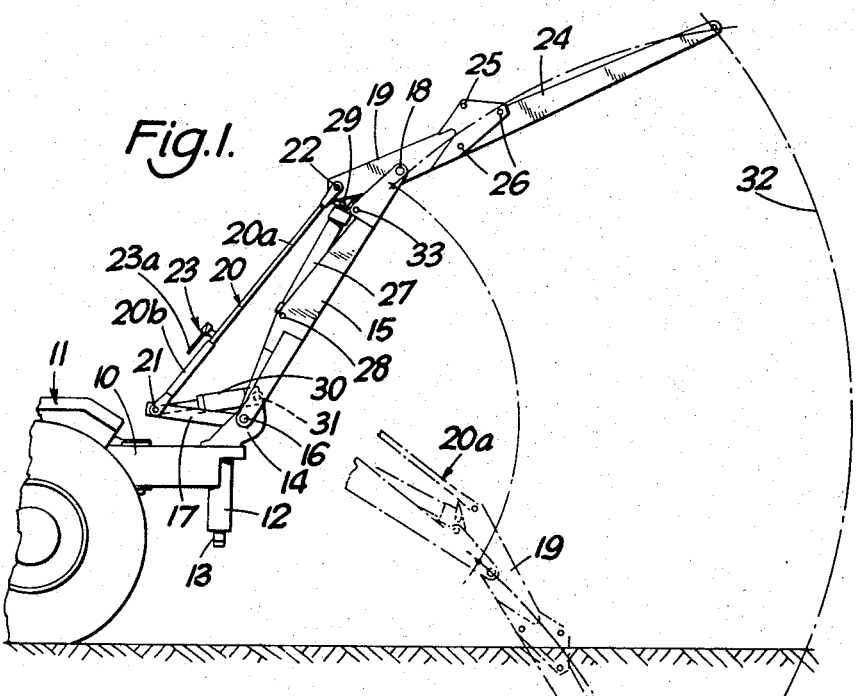
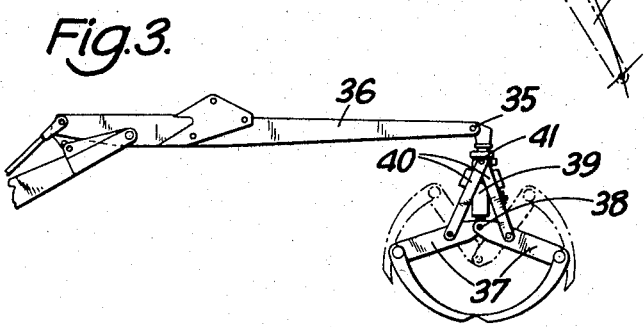
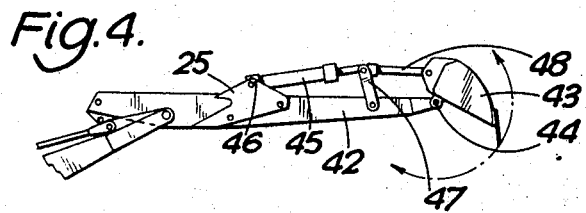

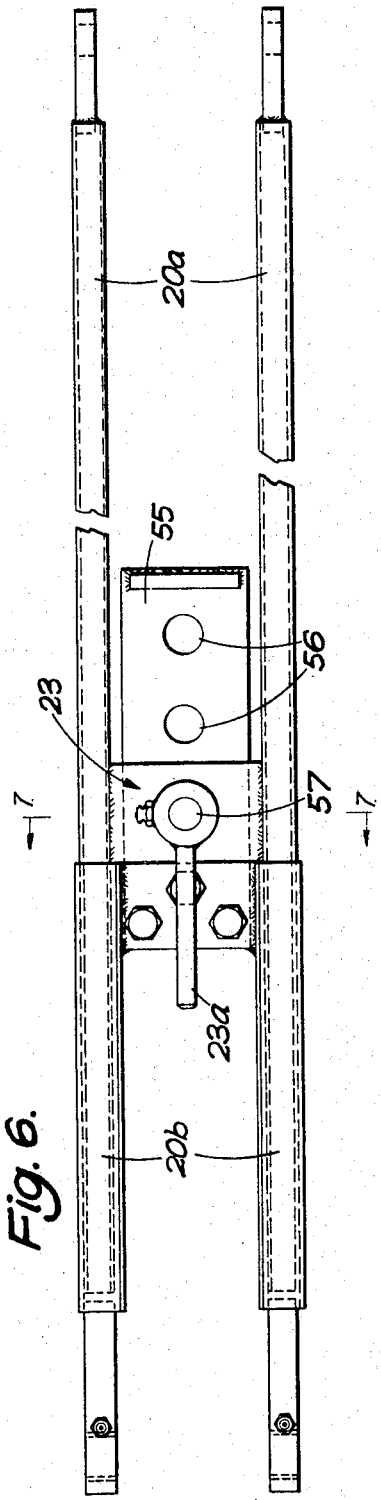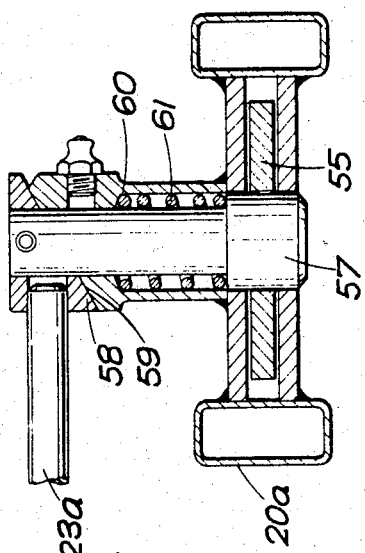

United States Patent Office 3,441,155
Patented Apr. 29, 1969

3,441,155
ADJUSTABLE IMPLEMENT CARRYING STRUCTURES
Harry William Norton, Ludlow, England, assignor to T. W. McConnel Limited, Ludlow, England, a British company
Filed May 22, 1967, Ser. No. 640,140
Int. Cl. E02f 3/62
U.S. Cl. 214—138                                   12 Claims

ABSTRACT OF THE DISCLOSURE

An adjustable implement-carrying structure comprises a closed linkage or four links pivoted together to form a quadrilateral in a vertical plane, the linkage as a whole being pivotally connected to a fixed support. A first ram maintains the linkage rigid and adjusts its shape, and a second ram pivots the linkage as a whole. A pivotal connection between two of the links is detachable so that three of the links can be made into a rigid assembly to which the other link is pivotally connected, with the first ram connected between the rigid assembly and the link.

---

The invention relates to adjustable implement carrying structures of the kind comprising a closed linkage of four links pivoted together to form a quadrilateral and arranged substantially in a vertical plane, one of the links (hereinafter referred to as the jib arm link) comprising, or having attached thereto, part of a jib arm for carrying an implement, and at least one of the other links being pivotally connected to a member fixed in relation to the linkage, or a part attached to such a member, first adjustable means connected between any two of the links for maintaining the linkage rigid and adjusting its shape, and second adjustable means, connected between at least one of the links and a part of the apparatus fixed in relation to the linkage, for adjusting the position of the linkage as a whole relatively to the fixed part.

Structures of this kind are suitable for carrying many different types of implement, and in particular: loaders for picking up material from the ground and loading it into a vehicle; diggers employing a grab; "back hoe" diggers for digging ditches, trenches, foundations, pits, etc.; face shovels; hedge cutters employing a reciprocatory cutter bar, rotary blade, or flail; verge trimmers; and dyke or bank mowers.

While all these types of implement may be carried by a structure having a geometry of the kind referred to some of them, for example, "back hoe" diggers, are preferably carried by a structure having a different geometry, to give a different field of movement to the implement. It is an object of the invention to provide a single implement-carrying structure the geometry of which may be adjusted according to the type of implement to be carried.

According to the invention an adjustable implement carrying structure of the kind referred to is characterised in that the pivotal connection between a first link and a second link of said linkage is detachable, and means are provided for preventing relative pivotal movement between the third and fourth links when the connection is detached, so that the third and fourth links form a rigid assembly to which the second link is pivotally connected, the aforesaid first and second adjustable means being so disposed that, after detachment of the first link from the second link, the first adjustable means are connected between the rigid assembly and the second link, and the second adjustable means are connected between either the rigid assembly or the second link and the aforesaid part fixed in relation to the linkage.

Said first link may itself constitute said means for preventing relative pivotal movement between the third and fourth link when the first link is detached, the first link being arranged for connection to the third link, on the opposite side of the linkage, so that the first, third and fourth links form said rigid assembly to which the second link is pivotally connected.

One of the links forming the rigid assembly, perferably said first link, may be adjustable in length whereby the configuration of the rigid assembly may be adjusted. For example the adjustable link may comprise a number of parts which are relatively movable in a manner to vary the overall length of the link, means being provided to locate the parts in a plurality of relative positions, giving a plurality of alternative lengths for the link. Said means for locating the parts of the link in a plurality of relative positions are preferably so constructed that they may be rendered inoperative whereby said parts are freely movable relatively to one another during operation of the structure.

In any of the above arrangements said second link is preferably the jib arm link.

In any of the above arrangements said first adjustable means may be connected between the second link and the third link.

Said fourth link may be pivotally connected to said member fixed in relation to the linkage and may be pivotally connected thereto at the point where the fourth link is also pivotally connected to another link.

Said second adjustable means may be connected between the fourth link and the aforesaid part fixed in relation to the linkage.

Either or each adjustable means may be connected to a link at the point where the link is pivotally connected to an adjacent link.

Either or each adjustable means may comprise a fluid energised ram.

In any of the above arrangements the structure may be provided with means for attaching it to the rear of a tractor. Preferably the structure is adapted for attachment to the rear of the tractor at such a level as to permit towing hitches and/or a transmission from the power take-off shaft of the tractor to pass beneath the structure.

The following is a more detailed description of one embodiment of the invention reference being made to the accompanying drawings in which:

FIGURE 1 is a side elevation of an adjustable implement carrying structure;

FIGURES 3, 4 and 5 are side elevations showing examples of implements which may be attached to the structure of FIGURES 1 and 2;

FIGURE 6 is a plan view showing the details of adjustable link 20; and

Figure 2:
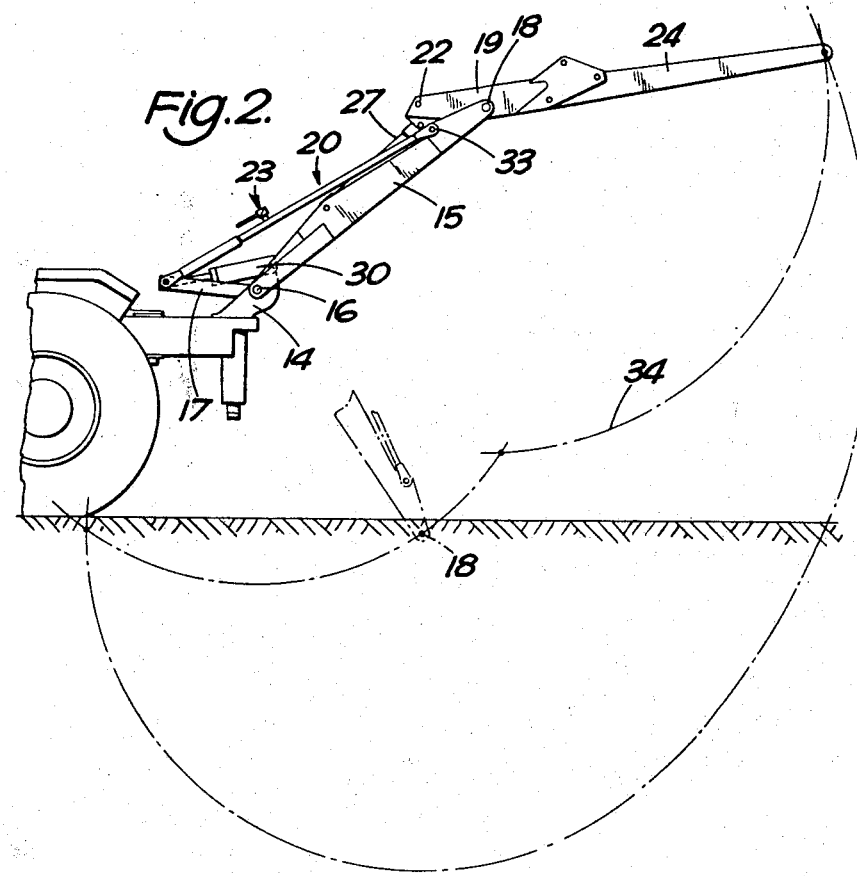
FIGURE 2 is a similar view to FIGURE 1 showing the structure adjusted to a different configuration.

FIGURE 7 is a sectional view taken substantially along the lines 7—7 of FIG. 6 showing lever 23a rotated 180° thereby locking together parts 20a and 20b.

A support cradle 10 is mounted on the rear of a tractor which is indicated at 11. The support cradle 10 may be adjustably mounted on the tractor so that it can either be located on the fore-and-aft central axis of the tractor, or may be swung to either side of said axis. At the rear of the cradle 10 is provided a bearing structure 12 or a vertical post 13 having secured at the upper end thereof a part 14.

Means (not shown) are provided for slewing the post 13 about a vertical axis. For example, this means may comprise fluid energised rams disposed within the cradle 10 and acting on a chain encircling a sprocket wheel secured to the post 13.

A triangular link 15 is pivotally mounted at 16 on the part 14 and a further short link 17 is also pivotally connected to the part 14 at 16. Pivotally connected at 18 to the upper end of the link 15 is a jib arm part 19.

The lower end of an adjustable link 20 is pivotally connected at 21 to the link 17, and the upper end of the link 20 is pivotally connected at 22 to the jib arm part 19. The pivotal connection is a readily detachable connection comprising a removable pivot pin.

The adjustable link 20 is telescopic and comprises two joined parallel shafts 20a the lower ends of which are slidably received within parallel joined sleeves 20b. There is provided a device (indicated at 23) for locating the parts 20a and 20b in required relative positions. The device 23 comprises a plate 55 secured between the sleeves 20b and formed with a number of holes 56 spaced apart in the direction of the length of the link. A spring loaded plunger 57 is mounted between the shafts 20a and is engageable with different holes in the plate in different relative longitudinal positions of the parts 20a and 20b. A lever 23a is secured to the upper end of the plunger and a cam surface 58 on the upper end of the plunger co-operates with a fixed cam surface 59 on the mounting 60 for the plunger so that when the lever 23a is swung through 180° the cams 58, 59 cause the plunger to be lifted out of the hole which it was engaging, against the action of the spring 61, so that the parts 20a and 20b of the link are free to telescope one within the other.

The jib arm part 19 is so constructed that there may be attached to it various implement carrying booms of the kind indicated at 24. For clarity an implement is not shown attached to the boom 24 in the drawings. The jib arm part 19 is formed with a socket 25 into which the end of the boom 24 is inserted and secured by bolts or pins 26. The line joining the bolts or pins 26 is inclined with respect to the length of the boom so that by reversing the boom 24 it may be arranged to be inclined upwardly with respect to the part 19. This increases the upward reach of the boom if required.

A fluid energised "reach ram" indicated at 27, is connected between a point 28 on the triangular link 15 and a point 29 on the jib arm part 19 intermediate of the pivotal connections 18 and 22.

A fluid energised "lift" ram indicated at 30, is connected between the pivotal connection 21 and a point 31 on the part 14.

In the arrangement shown in FIGURE 1 the links 20, 19, 15 and 17 constitute the aforementioned first, second, third and fourth links, respectively. The fluid energised "reach" ram 27 constitutes the aforesaid first adjusting means, and the fluid energised "lift" ram 30 constitutes the aforesaid second adjusting means.

With the arrangement shown in FIGURE 1 the "reach" ram 27 holds the linkage 20, 19, 15, 17 rigid and by extension or contraction of the ram the configuration of this linkage can be adjusted. The "lift" ram 30 may be extended or contracted to adjust the position of the linkage 20, 19, 15, 17 as a whole with respect to the part 14, the part 14 constituting the aforesaid member fixed in relation to the linkage.

With the linkage as shown in FIGURE 1, the envelope of movement of the end of the implement boom 24 is as shown by the chain line indicated at 32. It will be seen that the power of the rams can be translated to a horizontal thrust at the upper part of the envelope, and to a vertical lift at the lower part of the envelope. Thus the geometry of the linkage is particularly suitable when the implement connected to the end of the boom 24 is, for example, a loader (such as is shown in FIGURE 3) for lifting material from or below ground level and then moving it horizontally to deposit it in a trailer. This geometry is also suitable when the implement attached to the boom 24 is a digger in the form of a grab, for example, for digging sludge from a pit. Such a digger may continually lift sludge from one point in the pit, without the necessity of moving horizontally below ground level since the sludge is a flowable material.

Figure 5:
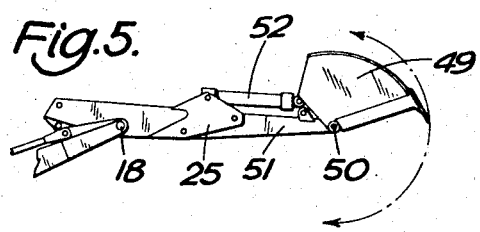

The envelope of movement 32 shown in FIGURE 1 is not, however, particularly suitable for certain other forms of implement, for example, a "back hoe" digger such as is shown in FIGURE 4, or a trencher such as is shown in FIGURE 5. Using such implements digging cannot be carried out at a single point in a pit or trench but the digger must bite into and sweep along the bottom and walls of the pit or trench. When it is required to employ such an implement on the jib arm, therefore, the linkage is adjusted to alter its geometry to the configuration shown in FIGURE 2. To do this the pivotal connection 22 is detached and the upper end of the link 20 is connected to the link 15 at 33.

As mentioned above the detachable pivotal connection 22 may comprise a removable pivot pin passing through registering holes in the end of the link 20 and jib arm part 19. A similar hole is formed at 33 in the link 15 so that the pivot pin, when detached from the connection between the links 20 and 19, may be employed to connect the link 20 to the link 15 at point 33. The three links 20, 15 and 17 then form a rigid triangular assembly to which the jib arm 19 is pivotally connected at 18. Operation of the "reach" ram 27 thus simply swings the jib arm 19 in relation to the rigid triangular assembly whereas operation of the "lift" ram 30 swings the triangular assembly bodily about the point 16 on the part 14.

This alteration in the geometry of the linkage enables the end of the boom 24 to move within the envelope shown in chain line and indicated at 34 in FIGURE 2.

It will be seen that the envelope of movement 34 permits a scooping action of the implement at the end of the boom 24 when below ground level. It provides less horizontal movement of the implement above ground level than did the configuration of the linkage shown in FIGURE 1 but this less necessary than it was in the case where the implement being used was a loader.

The adjustment in length of the link 20 may be used to vary the geometry of the structure in both the configuration of FIGURE 1 and the configuration of FIGURE 2. It is found in practice, however, that to obtain the most useful envelope of movement for the implement the link 20 should be shorter in the arrangement of FIGURE 1 that it is in the arrangement of FIGURE 2.

As mentioned earlier the locating device 23 may be disengaged by swinging the arm 23a through 180°. The shafts 20a are then free to slide longitudinally within the sleeves 20b. In some circumstances it may be desirable to operate the structure in this condition, without reengaging the device 23. For example, when a digger such as is shown in FIGURE 4 is mounted on the boom 24 it may be required to draw the digger substantially horizontally towards the tractor, for example, when scooping along the bottom of a level trench. In this case the device 23 is left disengaged so that the link 20 is in a "floating" condition and in this case the digger may be drawn towards the tractor by extending the reach ram 27, the floating condition of the link 20 permitting the link 15 to swing upwardly, telescoping the link 20, as the digger is drawn along the floor of the trench.

Referring now the implements shown in FIGURES 3, 4 and 5; FIGURE 3 shows a loader suspended at 35 from the end of a boom 36. The loader comprises two grab arms 37 pivotally connected together at 38. A fluid energised ram 39 is suspended from the end of the boom 36 and the piston rod of the ram is pivotally connected to the pivotal connection 38 between the grab arms. Links 40 are pivotally connected at their lower ends to the grab arms 37 respectively, and the upper ends of the links 40 are pivotally connected to the ram body at 41. It will be seen that extension of the ram 39 opens up the grab arms 37 to the chain line position shown in FIGURE 3.

FIGURE 4 shows a "back hoe" digger in which a shorter boom 42 has a shovel 43 pivotally connected to its end at 44. A fluid energised ram 45 is pivotally connected at 46 to the socket part 25 of the jib arm, and the piston rod of the ram is connected to links 47 and 48 which are connected to the boom 42 and shovel 43 respectively. It will be seen that extension of the ram 45 imparts a scooping action to the digger head 43.

The trencher shown in FIGURE 5 is somewhat similar to the digger of FIGURE 4 and comprises a trenching shovel 49 pivotally mounted at 50 on the end of a short boom 51. A fluid energised ram 52 is connected between the socket part 25 of the jib arm and the trencher shovel 49 so that extension of the ram 52 imparts a scooping action to the shovel.

The linkage arrangement shown in FIGURE 1 is primarily suitable for the loader shown in FIGURE 3 whereas the geometry of the arrangement shown in FIGURE 2 is more suitable for the digger and trencher as shown in FIGURES 4 and 5 respectively.

Also there may be provided means for adjusting the point of connection between the "reach" ram 27 and the jib arm part 19. For example the upper end of the piston rod of the ram 27 may be pivotally connected to one end of a short link the other end of which is pivotally connected to the part 19. Means are then provided for adjusting the angle of the short link with respect to the part 19 thereby effectively adjusting the point of pivotal connection between the ram 27 and the link 19.

I claim:

1. An adjustable implement carrying structure comprising a closed linkage of four links pivotally interconnected to form a quadrilateral and arranged substantially in a vertical plane, one of said links comprising part of a jib arm for carrying an implement, at least one of the other of said links being pivotally connected to a fixed member, first adjustable means connected between said one of said links and one of the three other links for maintaining the linkage rigid and adjusting its shape, second adjustable means, connected between at least one of said three other links and a part of the apparatus fixed in relation to the linkage, for adjusting the position of the linkage as a whole relatively to the fixed part, a pivotal connection between said one of said links and a second link of said linkage being detachable, means for connecting said second link to the other link to which said one of said links remains pivotally connected when the connection is detached, so as to form a rigid assembly of three links to which assembly said one of said links is pivotally connected, said first adjustable means being connected between said rigid assembly and said one of said links, and said second adjustable means being connected between said rigid assembly and the aforesaid part fixed in relation to the linkage.

2. Apparatus according to claim 1 wherein one of the three links forming the rigid assembly is adjustable in length.

3. A structure according to claim 2 wherein said second link is adjustable in length.

4. A structure according to claim 2 wherein the adjustable link comprises a number of parts which are relatively movable in a manner to vary the overall length of the link, means being provided to locate the parts in a plurality of relative positions, giving a plurality of alternative lengths for the link.

5. A structure according to claim 4 wherein said means for locating the parts of the link in a plurality of relative positions are so constructed that they may be rendered inoperative whereby said parts are freely movable relatively to one another during operation of the structure.

6. A structure according to claim 1 wherein said first adjustable means are connected between said one of said links and said other link to which said one of said links remains pivotally connected when said detachable pivotal connection is detached.

7. A structure according to claim 6 wherein one of said three other links is pivotally connected to said fixed member at the point where it is also pivotally connected to another link.

8. A structure according to claim 7 wherein said second adjustable means are connected between the said one of said three other links and the aforesaid part fixed in relation to the linkage.

9. A structure according to claim 1 wherein either adjustable means is connected to a link at the point where the link is pivotally connected to an adjacent link.

10. A structure according to claim 1 wherein each of said first and second adjustable means comprises a fluid energized ram.

11. A structure according to claim 1 wherein the fixed member is attached to the rear of a tractor.

12. A structure according to claim 11 wherein the fixed member is adapted for attachment to the rear of a tractor at such a level as to permit towing hitches and a transmission from the power take-off shaft of the tractor to pass beneath the structure.

References Cited

UNITED STATES PATENTS

| 3,034,671 | 5/1962 | Schwellenbach | 214—138 |
| 3,129,832 | 4/1964 | Metailler | 214—138 |

HUGO O. SCHULZ, *Primary Examiner.*

U.S. Cl. X.R.

37—103; 214—147